(12) United States Patent
Carroll et al.

(10) Patent No.: US 12,288,286 B1
(45) Date of Patent: Apr. 29, 2025

(54) PARSE TECHNIQUES FOR GRAPHICS WORKLOAD DISTRIBUTION

(71) Applicant: Apple Inc., Cupertino, CA (US)

(72) Inventors: Jason D. Carroll, Oviedo, FL (US); Ali Rabbani Rankouhi, Bushey (GB); Michael A. Mang, Oviedo, FL (US); Ralph C. Taylor, Deland, FL (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 18/055,118

(22) Filed: Nov. 14, 2022

Related U.S. Application Data

(60) Provisional application No. 63/376,191, filed on Sep. 19, 2022.

(51) Int. Cl.
*G06T 15/00* (2011.01)

(52) U.S. Cl.
CPC ........ *G06T 15/005* (2013.01); *G06T 2200/28* (2013.01); *G06T 2210/52* (2013.01)

(58) Field of Classification Search
CPC G06T 15/005; G06T 2200/28; G06T 2210/52
USPC .................. 345/419, 420, 426, 505; 709/217
See application file for complete search history.

(56) References Cited

U.S. PATENT DOCUMENTS

| | | | |
|---|---|---|---|
| 8,941,653 B2 | 1/2015 | Molnar et al. | |
| 10,332,310 B2 | 6/2019 | Agrawal et al. | |
| 10,643,374 B2 | 5/2020 | Snrti et al. | |
| 10,963,985 B2 | 3/2021 | Doyle et al. | |
| 10,991,127 B2 | 4/2021 | Nevraev et al. | |
| 2007/0091088 A1* | 4/2007 | Jiao | G06T 15/005 345/426 |
| 2014/0297798 A1* | 10/2014 | Bakalash | G06T 15/005 709/217 |
| 2015/0178987 A1* | 6/2015 | Hurd | G06F 1/3203 345/420 |
| 2017/0199542 A1* | 7/2017 | Sylvester | G06F 1/3253 |
| 2019/0108671 A1* | 4/2019 | Rollingson | G06T 15/005 |
| 2019/0206110 A1* | 7/2019 | Gierach | G06F 9/38 |
| 2019/0236827 A1 | 8/2019 | Hakura et al. | |
| 2020/0051286 A1 | 2/2020 | Nevraev et al. | |
| 2020/0302584 A1* | 9/2020 | Zhang | G06F 18/214 |
| 2020/0349769 A1* | 11/2020 | Yuan | G06T 1/20 |
| 2020/0410631 A1 | 12/2020 | Doyle et al. | |
| 2022/0058872 A1 | 2/2022 | Schmalstieg et al. | |
| 2022/0245883 A1 | 8/2022 | Baker et al. | |

(Continued)

OTHER PUBLICATIONS

Office Action in U.S. Appl. No. 18/055,111 mailed Mar. 6, 2024, 7 pages.

*Primary Examiner* — Prabodh M Dharia
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to distributing geometry work in a graphics processor. In some embodiments, multiple geometry pipelines are configured to process, in parallel, multiple segments of a set of geometry work. In some embodiments, control circuitry is configured to split operations from the set of graphics work into the multiple segments. This may include parsing a control stream for the set of graphics work to determine an initial work estimate based on numbers of primitives in different draw calls and adjusting the initial work estimate based on a complexity determination for the draw call.

20 Claims, 10 Drawing Sheets

(56) References Cited

U.S. PATENT DOCUMENTS

2022/0262059 A1* 8/2022 Burke .................. G06F 9/4881
2023/0096188 A1* 3/2023 Szerszen ................ G06T 1/60
　　　　　　　　　　　　　　　　　　　　　345/419
2023/0333895 A1* 10/2023 Livesley .............. G06T 15/005

* cited by examiner

PARSE TECHNIQUES FOR GRAPHICS WORKLOAD DISTRIBUTION

CROSS-REFERENCE TO RELATED APPLICATIONS

The present application claims priority to U.S. Provisional Application No. 63/376,191, filed Sep. 19, 2022, the disclosure of which is incorporated by reference herein in its entirety.

This application is related to application Ser. No. 18/055,111.

BACKGROUND

Technical Field

This disclosure relates generally to computer graphics processors and more particularly to geometry processing circuitry and shaders.

Description of the Related Art

Graphics processing tasks typically include geometry work, e.g., which is typically performed on vertex information for primitives (e.g., triangles) in a graphics scene. After geometry processing, rasterization may generate pixel data for pixel shaders that generate pixel attributes for a frame of graphics data.

Geometry processing may utilize both fixed-function circuitry and shaders (e.g., vertex shaders or object shaders and mesh shaders). As graphics processors grow more complex, distributing geometry work efficiently may improve performance, reduce power consumption, or both.

DETAILED DESCRIPTION

Figure 1A:
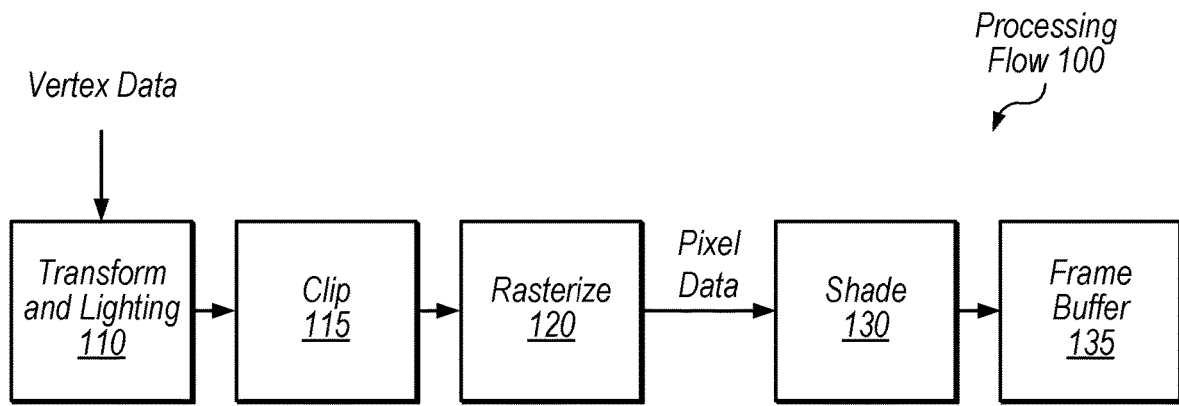
FIG. 1A is a diagram illustrating an overview of example graphics processing operations, according to some embodiments.

As graphics processors grow more complex, distributing geometry work efficiently may improve performance, reduce power consumption, or both. For example, both fixed-function geometry pipeline circuitry and shader circuitry configured to execute geometry tasks (e.g., vertex shaders, object shaders, and mesh shaders) may be distributed across multiple graphics processor sub-units or "mGPUs." A given set of geometry work (which may be referred to as a geometry "kick") may be segmented and distributed across multiple mGPUs for parallel execution.

For performance reasons, it may be desirable that the segments of a geometry kick finish execution at roughly the same time. Otherwise, a longer-running segment may delay completion of the kick, even when other segments have completed execution.

Using pre-parsing techniques, in some embodiments, control circuitry analyzes an incoming geometry kick to generate roughly equal segments (e.g., in terms of number of vertices processed) before distributing work from the geometry kick. As discussed in detail below, the control circuitry may use markers to denote bins of work and may dynamically adjust bin size during parsing. Once segments are processed (which may occur at least partially in parallel) the graphics processor may stitch results together for further processing (e.g., by a fragment shader).

In some embodiments, a geometry kick includes object shaders, which may generate outputs for consumption by mesh shaders. In some embodiments, control circuitry is configured to launch an initial version of an object shader that does not commit side effects to the architectural state of the processor, but outputs the number of children (e.g., mesh shaders) generated by the object shader. Thus, the architectural state of the device does not change based on running the initial version of the object shader (although the architectural state may change based on other programs that execute in parallel with the initial version of the object). This may further facilitate efficient distribution of the geometry kick by approximating the amount of work associated with the object shader for a given segment, or even determining to distribute the object shader across multiple segments.

In various embodiments, disclosed techniques may improve performance of geometry processing tasks, reduce power consumption, or both, relative to traditional techniques.

As mentioned above, multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware-managed memory coherency. Typically, graphics firmware or hardware programs configuration registers for each kick before sending the work to the pipeline for processing. Often, once a kick has started, it does not access a memory hierarchy past a certain level until the kick is finished (at which point results may be written to another level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. This set of resources may be referred to as a "kickslot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

In some embodiments, a graphics driver maps a new kick to one of multiple kickslots. Each kickslot may include a set of configuration registers and may have a context ID that indicates a mapping between the kick's virtual addresses and physical addresses. In some embodiments, virtual kickslot techniques map software-visible top slots to primary slots in hardware, which are then mapped to distributed hardware slots in one or more mGPUs.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
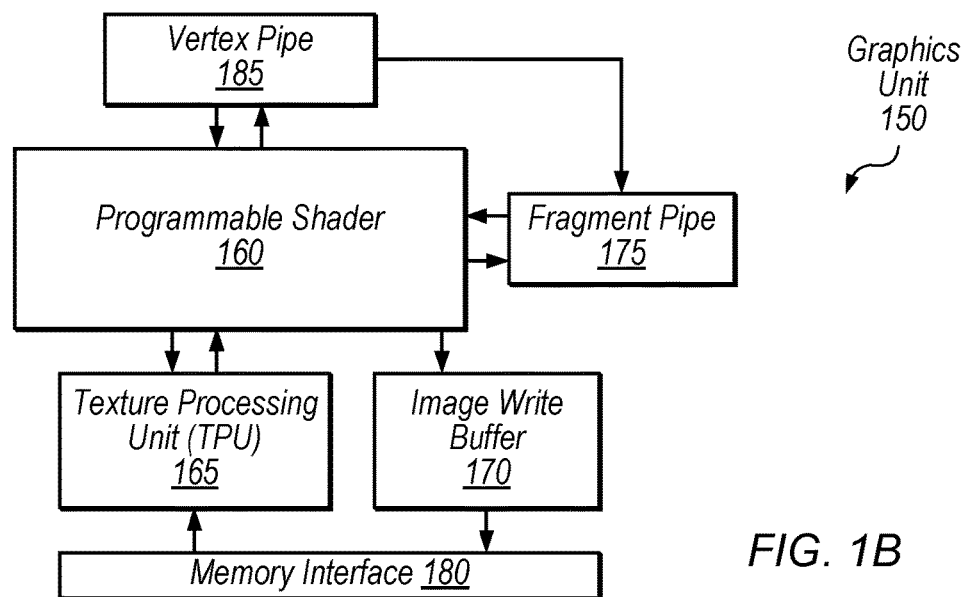
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Parsing for Workload Distribution

Figure 2:
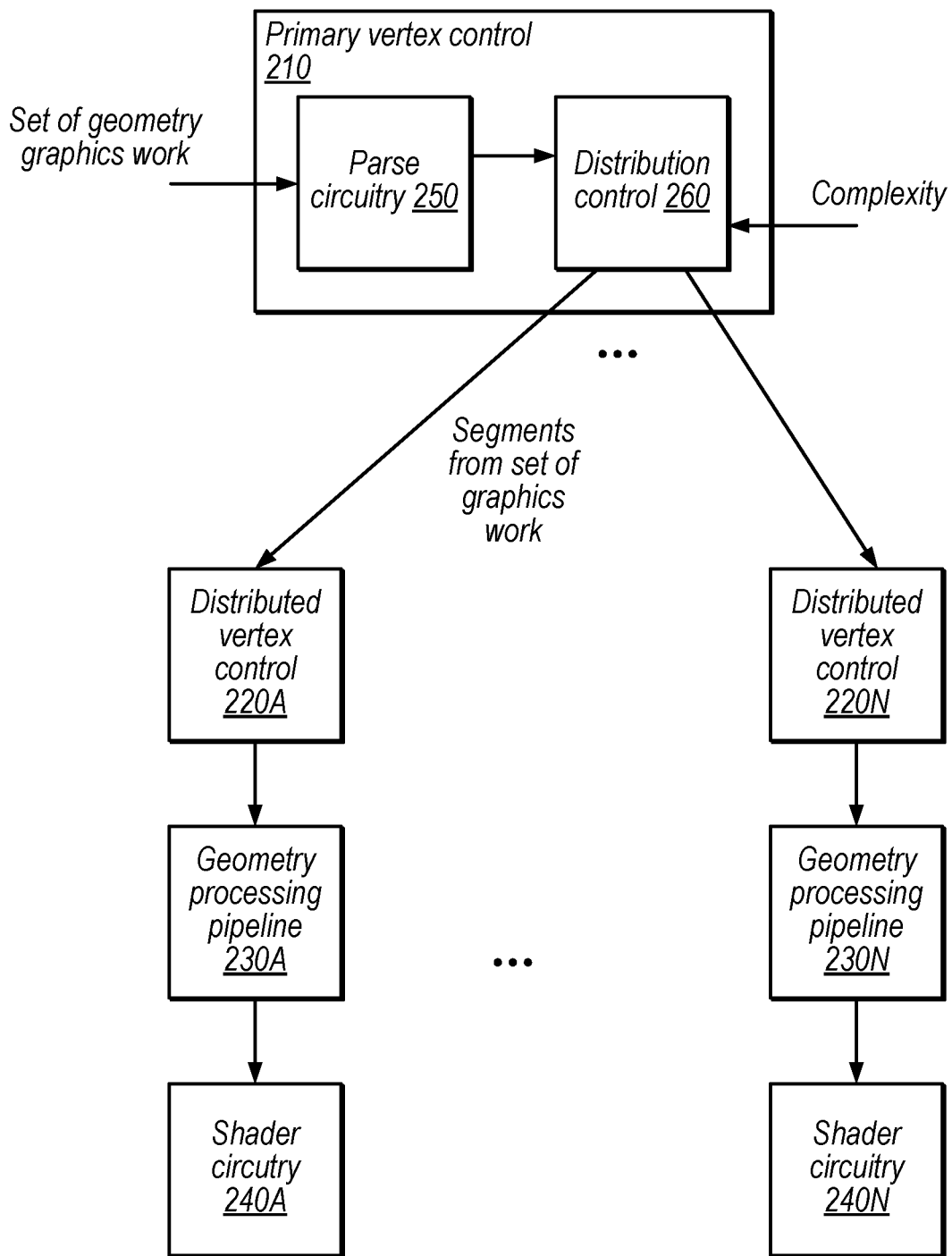
FIG. 2 is a block diagram illustrating example parsing of a set of geometry graphics work prior to distribution, according to some embodiments.

FIG. 2 is a block diagram illustrating example geometry work distribution to circuitry of a graphics processor, according to some embodiments. In the illustrated embodiment, the processor includes primary vertex control circuitry 210, distributed vertex control circuits 220A-220N, geometry processing pipelines 230A-230N, and shader circuitry 240A-240N. In some embodiments, each distributed vertex control circuit is implemented in a different processor sub-unit, e.g., an mGPU. Each mGPU may be configured to execute programs in parallel and may include: fragment generator circuitry, shader core circuitry configured to execute shader programs, memory system circuitry (which may include one or more caches and a memory management unit), geometry processing circuitry, and distributed workload distribution circuitry (such as distributed vertex control 220) which may coordinate with primary control circuitry to distribute work to shader pipelines.

Primary vertex control 210, in the illustrated embodiment, includes parse circuitry 250 and distribution control circuitry 260. As discussed below with reference to FIG. 3, this circuitry may divide a geometry kick into multiple segments for distribution to different mGPUs.

Parse circuitry 250, in some embodiments, receives information for a set of graphics work (e.g., a control stream for a geometry kick) and parses the work. The control stream may include draw calls, state information (e.g., for vertex control and primitive processing), and control operations such as fences, links, and returns. In some embodiments, the parsing includes determining the number of primitives included in different draw calls in the kick. This parse operation may be a "pre-parse" in the sense that it occurs before distribution of the work. Also, the control stream may be parsed again for actual processing. As discussed below with reference to FIG. 4, the parsing may divide the kick into bins of roughly equivalent size in terms of amount of work (note that the number of primitives may be a good indicator of the amount of work). The size of the bins may be dynamically increased during the parsing by adjusting marker information.

Distribution control circuitry 260, in some embodiments, receives data indicating the initial number of primitives for different draw calls from parse circuitry 250. In the illustrated embodiment, distribution control 260 also receives complexity information. The complexity information may indicate shader complexity for different draw calls. In some embodiments, distribution control 260 is configured to adjust an initial work estimate (e.g., based on the initial number of primitives for one or more draw calls) based on the complexity information (e.g., to increase the work estimate for more complex draw calls). As discussed in detail below, the graphics driver may provide a complexity factor that takes one or more inputs into account (e.g., shader complexity, output data size, number of varyings, etc.).

Based on estimated amounts of work for different draw calls, distribution control circuitry 260 is configured to segment a set of geometry work and distribute the work to different mGPUs. Specifically, distribution control circuitry 260 is configured to send information identifying assigned segments to distributed vertex control circuits 220.

A given distributed vertex control circuit 220, in some embodiments, is configured to distribute assigned work within an mGPU. This may include assigning work to a geometry processing pipeline corresponding to a hardware slot. Distributed vertex control circuits 220 may also be configured to perform various tasks such as page management, context switch control, reporting work completion to primary vertex control 210, etc. In some embodiments, distributed vertex control circuits 220 are included in geometry processing pipelines 230.

Geometry processing pipelines 230, in some embodiments, include fixed-function circuitry configured to operate on primitives or vertices in order to launch shaders for execution by shader circuitry 240. Pipelines 230 may be the first stage of a tile-based deferred render architecture. Pipelines 230 may be configured to decode the control stream, fetch state updates and indirect draw data, fetch index/patch data for draw calls, assemble indices/patches into primitives and test for vertex re-use, process primitives using shaded vertex data and perform culling/clipping, group primitives into primitive blocks and write them to memory, bin primitives into screen aligned tiles, create per-tile control streams, and manage memory pages. Pipelines 230 may include vertex buffers, clip circuitry, and a primitive processing pipeline, for example.

Shader circuitry 240, in some embodiments, corresponds to an instance of programmable shader 160. Shader circuitry 240 may include multiple distributed slots. Shader circuitry 240 may include SIMD group scheduling circuitry, instruction cache circuitry, operand storage, execution pipelines (which may include shared datapath blocks controlled by instructions scheduler circuitry), etc. to execute graphics programs. Shader circuitry 240 may be shared for vertex, pixel, and compute work.

Figure 3:
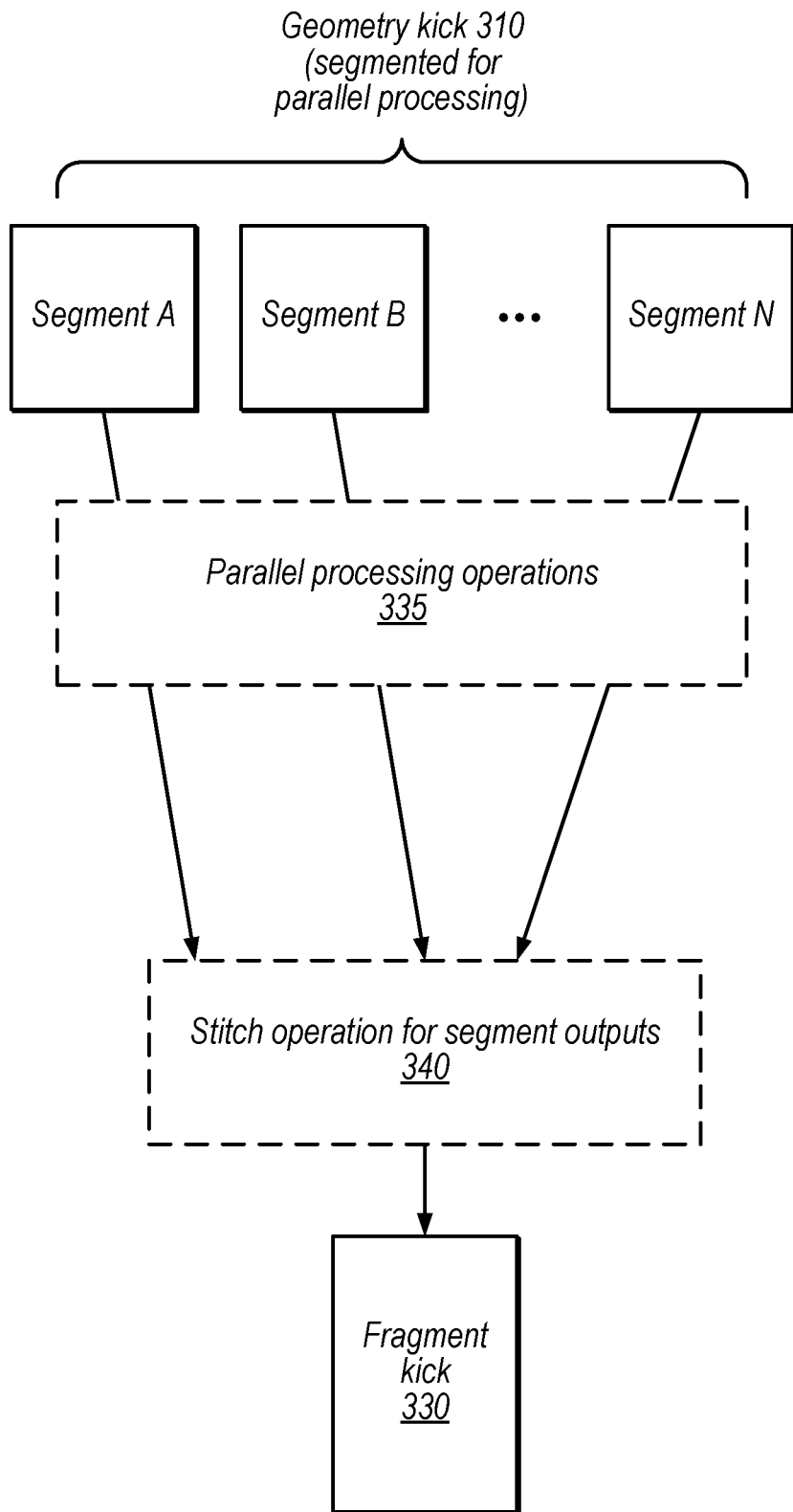
FIG. 3 is a block diagram illustrating example segmented geometry kick techniques, according to some embodiments.

FIG. 3 is a diagram illustrating example processing of multiple segments of a geometry kick, according to some embodiments. In the illustrated embodiment, geometry kick 310 generates output data to be processed by fragment kick 330. Kick 310 is segmented for parallel processing (segments A-N).

As shown, segments A-N are processed at least partially in parallel according to parallel processing operations 335, which may be performed by different geometry pipelines 230 and shader circuitry 240. In some embodiments, stitch circuitry is configured to perform stitch operation 340 to stitch outputs of the parallel processing operations. For example, the stitch operation may link lists of closed pages that store output data generated by geometry processing, layer identifier cache information, region array information, etc.

A layer identifier cache may allow the geometry processing phase to specify a layer of a final render target. A region array may be used for tile-based deferred rendering (TBDR) in which tiling engine circuitry may bin geometry into tiles and generate control streams to be processed by fragment processing circuitry (e.g., with a number of per-tile linked lists). Generally, stitch circuitry may link various outputs of geometry processing segments of a geometry kick that may be processed in parallel.

The stitch operation generates input data for fragment kick 330, in the illustrated embodiment. Note that some segments may be processed sequentially using the same segment identifier (e.g., appending to the same list(s)) such that stitching is not needed. As discussed above, distributing work roughly evenly among segment's A-N may have various advantages.

Example Marker Techniques

Figure 4A:
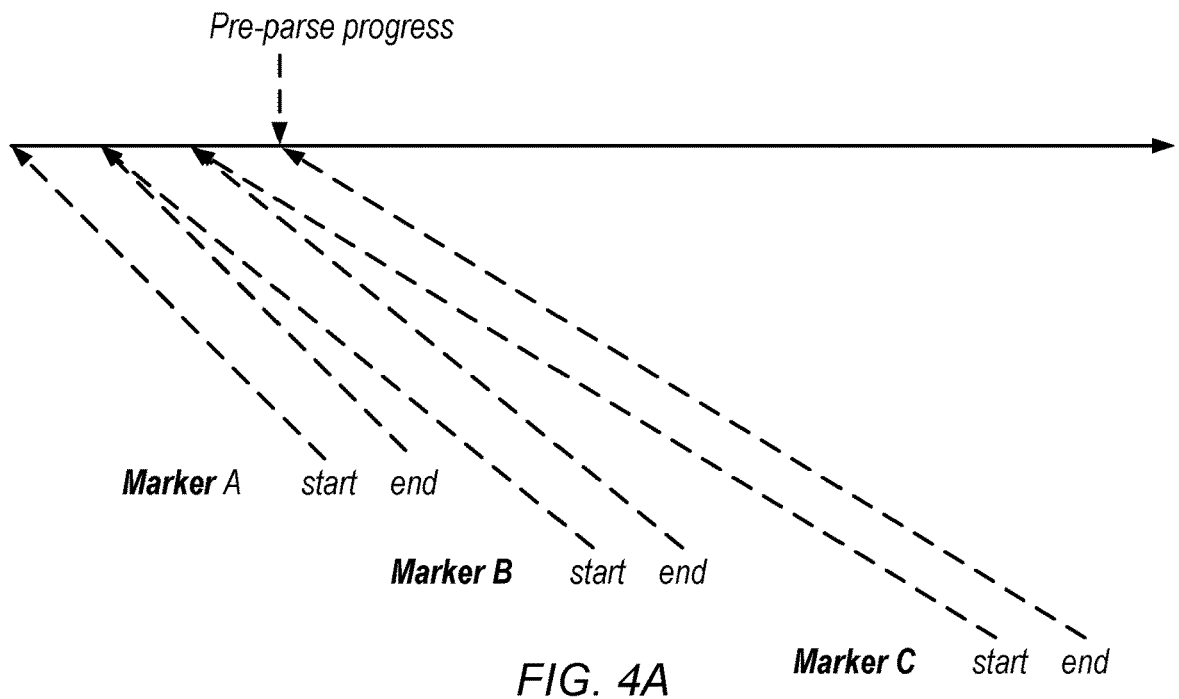
FIGS. 4A and 4B are diagrams illustrating example marker techniques for parsing, according to some embodiments.
Figure 4B:
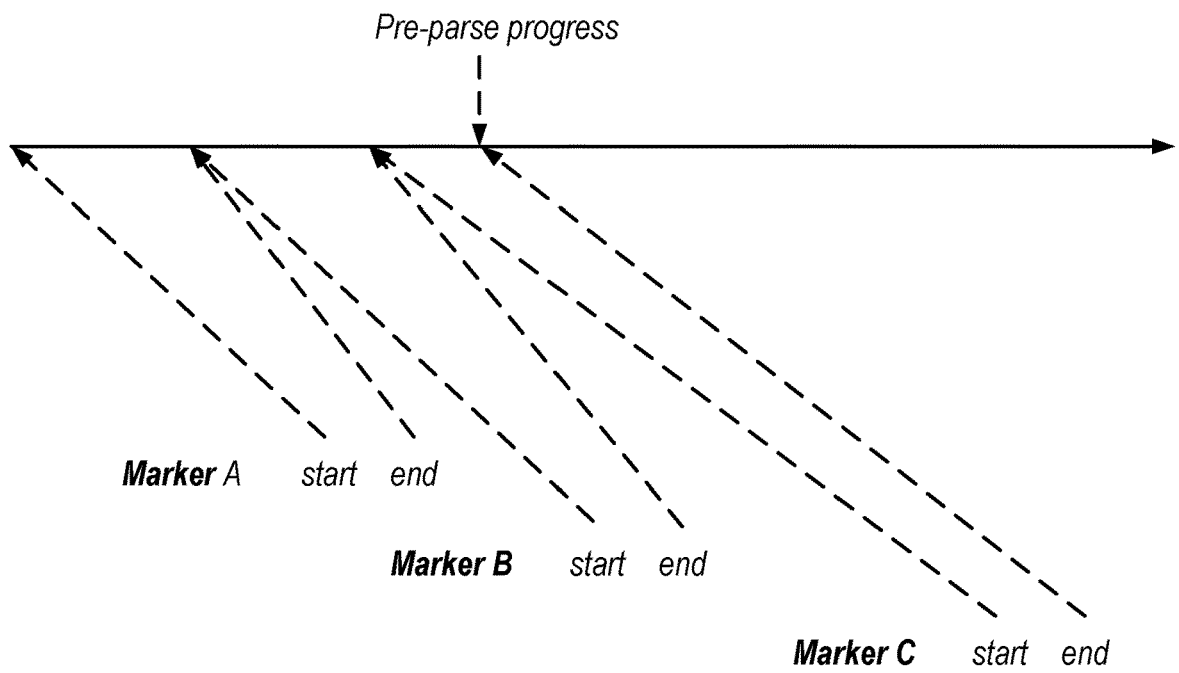

FIGS. 4A and 4B are diagrams illustrating example binning techniques to delineate segments of geometry work, according to some embodiments. Speaking generally, parse circuitry 250 may determine the amount of work in the whole kick and create segments for distributed processing. Parse circuitry 250 may follow any indirections in the control stream and also parse secondary control stream calls.

In the illustrated embodiment, parse circuitry 250 maintains information for three markers (A, B, and C), including start and end locations. These markers may define bins of work to be assigned to different segments. Parse circuitry 250 may also determine the state of the control stream at the point of a segment split, and storing this information as part of the marker information may avoid a need to pre-parse the control stream twice. This state may include state for a primitive processing pipeline (which may control viewport transform, amplification, culling, etc.), tessellation state words, call stack pointers, etc. Therefore, control circuitry may include a memory (e.g., a random access memory (RAM)) to store information for a number of different bins. Parse circuitry 250 may store marker information in the RAM, update the marker information while parsing the stream, and combine the marker information from entries in the RAM when increasing bin size.

Parse circuitry 250 may support various numbers of markers/bins; three bins are shown to facilitate explanation but are not intended to limit the scope of the present disclosure. Generally, however, parse circuitry 250 may support up to a threshold number of bins, which may correspond to a multiple of the number of available geometry processing pipelines 230, for example.

As represented in FIG. 4A, the bins may start at an initial size (e.g., one unit, which may be defined as a pre-determined amount of work) and the pre-parsing may proceed through the command stream assigning draw calls to bins based on the parsing analysis until the bins are full. If the pre-parse reaches the end of marker C in the illustrated example, the bin size is increased, e.g., as shown in FIG. 4B (a doubling in size, in this example). As the amount of work in a kick increases, the markers may be tracked between increasingly greater units (e.g., 4 units, 8 units, etc.). Once the end of the control stream is reached, parse circuitry 250 determines the markers that are closest to the split points to evenly distribute work among available geometry pipelines 230. Generally, there may be a tradeoff between the number of markers (which require a certain amount of storage per marker) and the granularity at which segments can be split.

For smaller kicks (e.g., that do not fill a threshold number of bins at the initial size), a single segment may be used rather than splitting segments. In some embodiments, the segments are split on primitive interleave marker (PIM) boundaries and the initial unit of a marker may correspond in size to the PIM size. For large kicks that fill a threshold amount of work for all bins, the control circuitry may split segments before reaching the end of the geometry kick and begin generating new segments for the kick, e.g., to be distributed sequentially after the first set of segments completes.

Example Techniques for Determining Amounts of Work During Parsing

Speaking generally, the complexity of a geometry processing pass may depend on several factors such as the number of primitives processed, the amount of input/output bandwidth, shader complexity, amount of vertex amplification and tessellation, and primitive coverage (which potentially ranges from not covering any sample to covering the whole graphics frame).

In various embodiments, parse circuitry 250 may estimate the amounts of work in draw calls for binning purposes based on various information, some of which may be available in the control stream and some of which may be received from other locations (e.g., from a graphics driver). In some embodiments (discussed below with reference to FIG. 5), parse circuitry 250 may also utilize an early run of an object shader to determine a number of children that it will launch (which may correspond to the number of meshlets generated based on the object shader).

In some embodiments, parse circuitry 250 is configured to determine the number of primitives, amplification count, and tessellation factors (e.g., through tessellation words) from the geometry kick control stream itself. In some embodiments, however, the shader complexity may not be known in the control stream (although a shader complexity estimate may be included in the control stream, in other embodiments). Further, the coverage of each primitive and the output bandwidth may depend on the amount of culling and on a tiling phase.

Therefore, in some embodiments, the graphics driver may generate a complexity factor field for a given draw call in the control stream. The driver may set this value based on factors such as shader complexity, input/output bandwidth, etc. (and may also consider factors that are also available in the control stream itself). In some embodiments, the driver uses the number of words output by vertex shaders because of its correlation with complexity. Similarly, the number of varyings may be considered when generating the complexity factor.

Parse circuitry 250 may estimate amounts of work based on the complexity factor field for a given draw call as well as information available in the control stream for the draw call. Thus, a draw call with a relatively smaller number of primitives may still be estimated to have a larger amount of work than a draw call with a relatively greater number of primitives due to other factors such as shader complexity.

Distribution control 260 may utilize demand-based distribution techniques to distribute segments. For example, distribution control 260 may initially distribute segments to mGPUs in a round-robin fashion and may distribute additional segments as mGPUs complete their segments and indicate their availability.

Example Early Run of Object Shader for Workload Distribution

Figure 5:
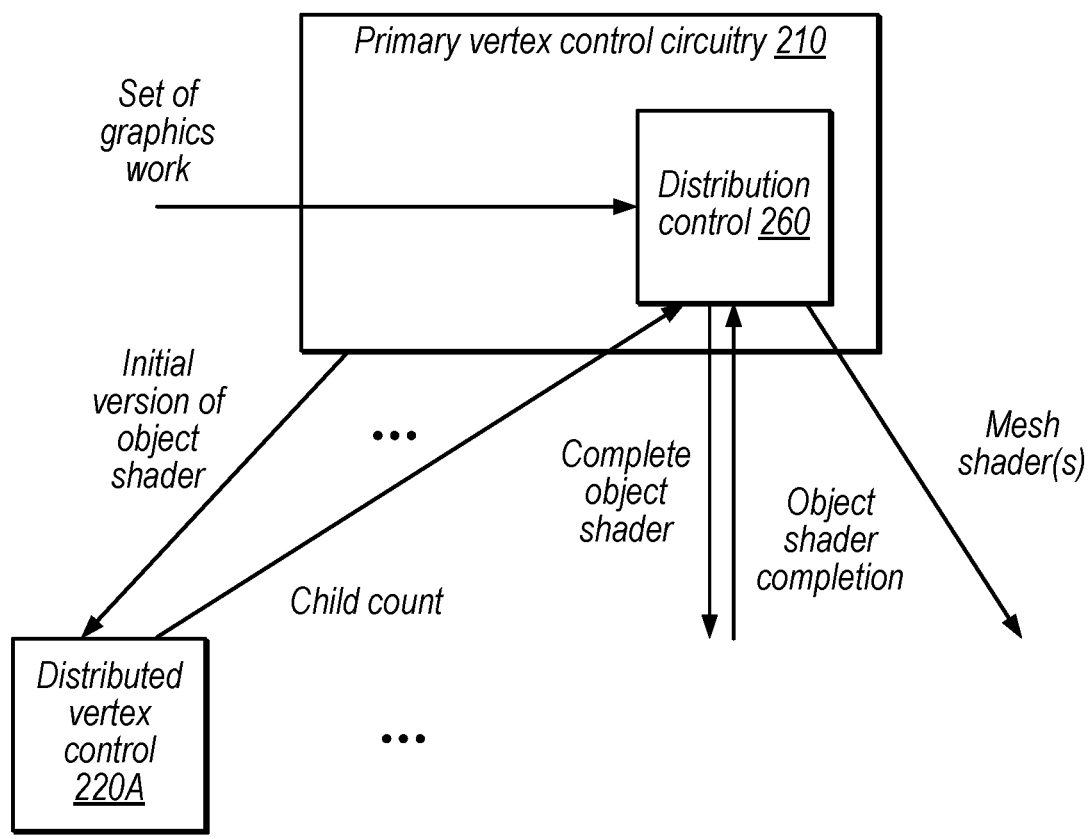
FIG. 5 is a block diagram illustrating control circuitry configured to run an initial version of an object shader to determine a child count before distributing a full version of the object shader, according to some embodiments.

FIG. 5 is a block diagram illustrating control circuitry configured to initiate an early run of an object shader to determine a child count, according to some embodiments. Various elements of FIG. 5 may be configured to operate as described above with reference to FIG. 2.

As a brief background to object shaders and mesh shaders, some processors support mesh techniques, in addition to or in place of traditional vertex shaders. In this context, object shaders (which may also be referred to as task shaders) may generate a number of child mesh shaders that may output meshlets. For example, a traditional graphics pipeline may include the following stages: vertex attribute fetch, vertex shader, tessellation, geometry shader, rasterization, and fragment shader stages. In contrast, a mesh-based graphics pipeline may include the following stages: object shader, mesh generation, mesh shader, and rasterization, which may provide more flexibility in vertex and geometry processing tasks. A given meshlet represents a number of vertices and primitives, and may have a maximum size for a given architecture.

In some embodiments, to more accurately estimate work in a geometry kick, primary vertex control circuitry 210 may launch an initial version of an object shader to one or more distributed vertex control circuits 220 in order to determine the number of children that the object shader emits. This determination may facilitate efficient distribution of work into similar-sized segments. In some embodiments, distribution control 260 communicates with parse circuitry 250 (not shown in FIG. 5) to generate segment boundaries.

In some embodiments, primary vertex control circuitry 210 may use similar distribution rules to distribute the initial version of the object shader as the full version of the object shader. The initial version may be generated by a compiler, for example, and may be configured to generate a child count value but may not affect the architectural state of the processor. For example, the compiler may generate the initial version by removing operations that do not contribute to determining child count. As a specific example, the initial version of the object shader may not generate inherited data for the mesh shader (while the full object shader run may generate object-shader-to-mesh-shader inherited data). Therefore, the initial version of the object shader may execute quickly relative to the full version.

For example, the initial version may, when encountering a DispatchMesh command, launch the object shader threadgroups to perform only the child-count computation, but not other computations. The child count may be maintained internally by distribution control circuitry 260, e.g., so that there is no memory buffer output from the initial version of the object shader. This may decouple the initial version from the full object shader data production and subsequent data consumption by one or more mesh shaders.

As shown, in the illustrated embodiment, distribution control circuitry 260 distributes a complete object shader and receives object shader completion signals, which may trigger launching of mesh shaders to consume the object shader results. Note that the initial version of the object shader, the complete object shader, and the mesh shader(s) may execute on the same set of one or more mGPUs or different sets of mGPUs, which may or may not overlap.

In some embodiments, distribution control 260 may distribute the full version of an object shader across multiple mGPUs if it generates a threshold number of children. Similarly, meshlets generated by the object shader may be distributed across multiple mGPUs.

Distribution control circuitry 260 may utilize a driver-provided value that indicates a number of primitives per meshlet to estimate the amount of work that will be produced. The driver may determine this value as an average number of primitives per mesh shader or as a maximum number of primitives per mesh shader, in various embodiments. Distribution control circuitry 260 may use this information to determine segment boundaries. Therefore, distribution control circuitry 260 may utilize various techniques discussed above for determining segment boundaries, with additional input based on the initial version of the object shader, which may result in even more equitable distribution of segments.

Example Methods

Figure 6:
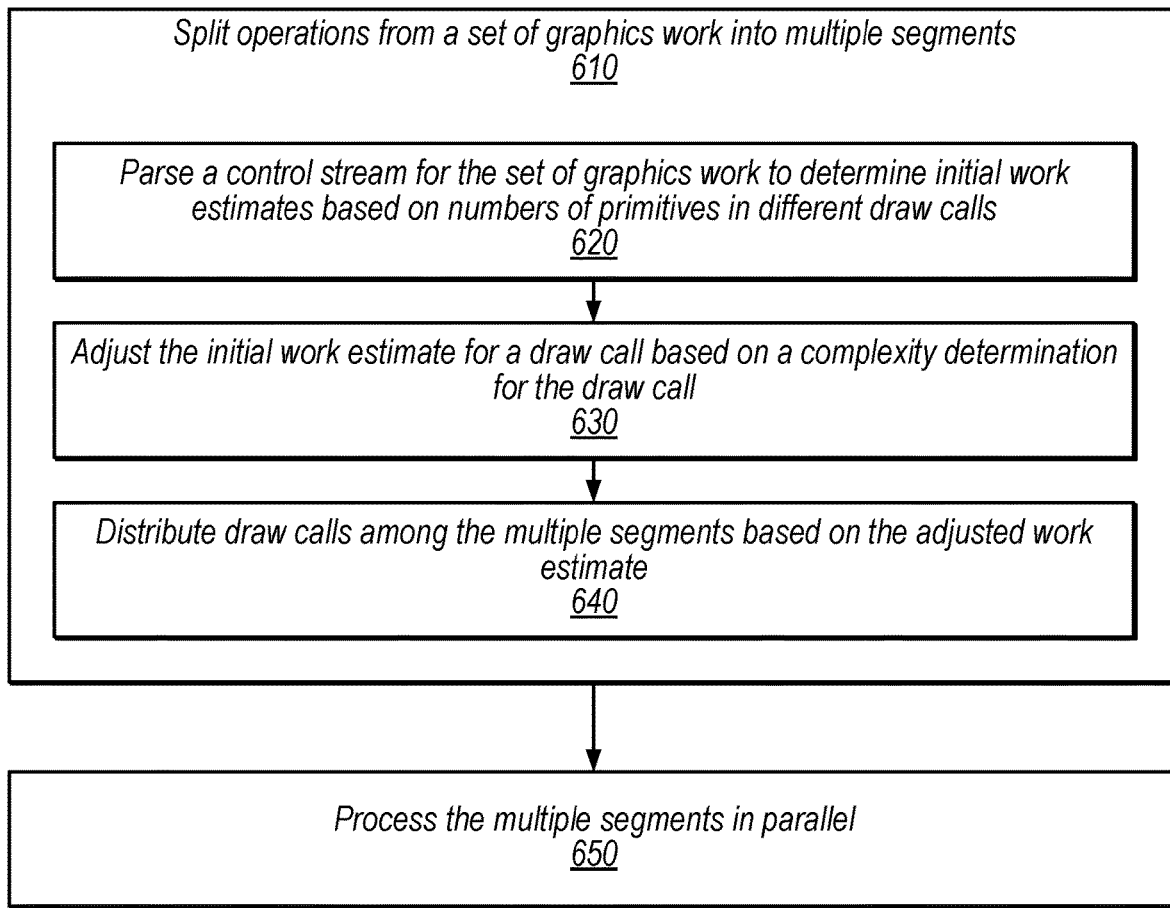
FIGS. 6-7 are flow diagrams illustrating example methods, according to some embodiments.

FIG. 6 is a flow diagram illustrating an example method for segmenting a set of graphics work (e.g., a geometry kick), according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a computing device (e.g., control circuitry) splits operations from a set of graphics work into multiple segments. In the illustrated embodiment, this includes elements 620-640.

At 620, in the illustrated embodiment, the control circuitry parses a control stream for the set of graphics work to determine initial work estimates based on numbers of primitives in different draw calls. The initial work estimates may directly specify numbers of primitives or may indicate other values that are based on the number of primitives.

The control circuitry may determine the number of primitives in different draw calls based on amplification information and tessellation information. The number of primitives may also be determined based on geometry information such as vertex information, primitive type, etc.

At 630, in the illustrated embodiment, the control circuitry adjusts the initial work estimate for a draw call based on a complexity determination for the draw call. In some embodiments the control circuitry receives the complexity determination from a graphics driver executed by a processor of the computing device.

The complexity determination may be based on shader complexity, e.g., based on the number of instructions and type of instructions included in a shader for a draw call. The complexity determination may be based on data size of output data to be generated by the draw call. The complexity determination may be based on executing a version of an object shader included in the set of graphics work to determine a number of child shaders or a number of meshlets to be generated by the object shader.

At 640, in the illustrated embodiment, the control circuitry distributes draw calls among the multiple segments based on the adjusted work estimate. This may include assigning draw calls to multiple bins based on the parse, including to increase amounts of work included in a given bin in response to reaching a threshold number of determined primitives for the set of graphics work.

At 650, in the illustrated embodiment, geometry pipelines process the multiple segments in parallel. Note that this means at least part of the segments are processed in parallel, but the entirety of the processing may not occur in parallel (e.g., one segment may complete execution before another is finished). Further, not all segments of a given kick may be processed in parallel, e.g., a large kick may generate a greater number of segments than parallel hardware can handle at once so some of the segments may be processed sequentially.

Figure 7:
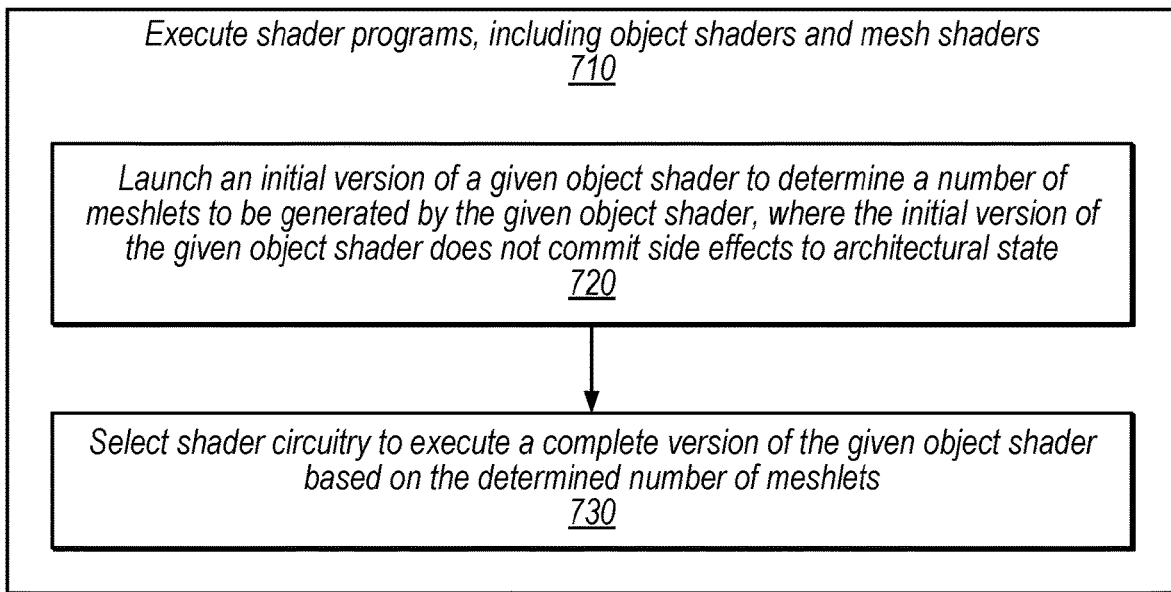

FIG. 7 is a flow diagram illustrating an example method for distributing work based on an early object shader run, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a computing device (e.g., shader circuitry) executes shader programs, including object shaders and mesh shaders. This includes elements 720 and 730, in the illustrated example.

At 720, in the illustrated embodiment, the computing device (e.g., vertex control circuitry) launches an initial version of a given object shader to determine a number of meshlets to be generated by the given object shader. In the illustrated embodiment, the initial version of the given object shader does not commit side effects to architectural state of the computing device.

At 730, in the illustrated embodiment, the computing device selects shader circuitry to execute a complete version of the given object shader based on the determined number of meshlets. In some embodiments, the initial and complete versions of the given object shader are received as part of a compiled graphics program. Therefore, a compiler may be configured to generate initial and complete versions of various object shaders to facilitate workload distribution. For example, the compiler may remove parts of an object shader that do not contribute to determining the number of children to generate the initial version.

In some embodiments, the device includes multiple distributed shader sub-units and is configured to distribute the given object shader across multiple shader sub-units in response to determining that the given object shader generates a threshold number of meshlets. Said another way, a large object shader may be distributed across multiple mGPUs. In some embodiments, the device is configured to assign meshlets generated by a given object shader to multiple shader sub-units (which may occur in some scenarios where the object shader is distributed across multiple mGPUs and in some cases where the object shader was distributed to a single mGPU).

In some embodiments, vertex control circuitry is configured to maintain bin information for multiple portions of a set of graphics work to be assigned to different shader sub-units and the selection of shader circuitry includes assignment of the given object shader to a bin based on the determined number of meshlets. In some embodiments, the device is configured to determine a number of primitives associated with the given object shader based on the determined number of meshlets and a driver-provided number of primitives per meshlet and select the shader circuitry based on the determined number of primitives. Therefore, a driver (or some other type of graphics program) may be configured to provide a number of primitives per meshlet to facilitate workload distribution, in some embodiments.

Example Device

Figure 8:
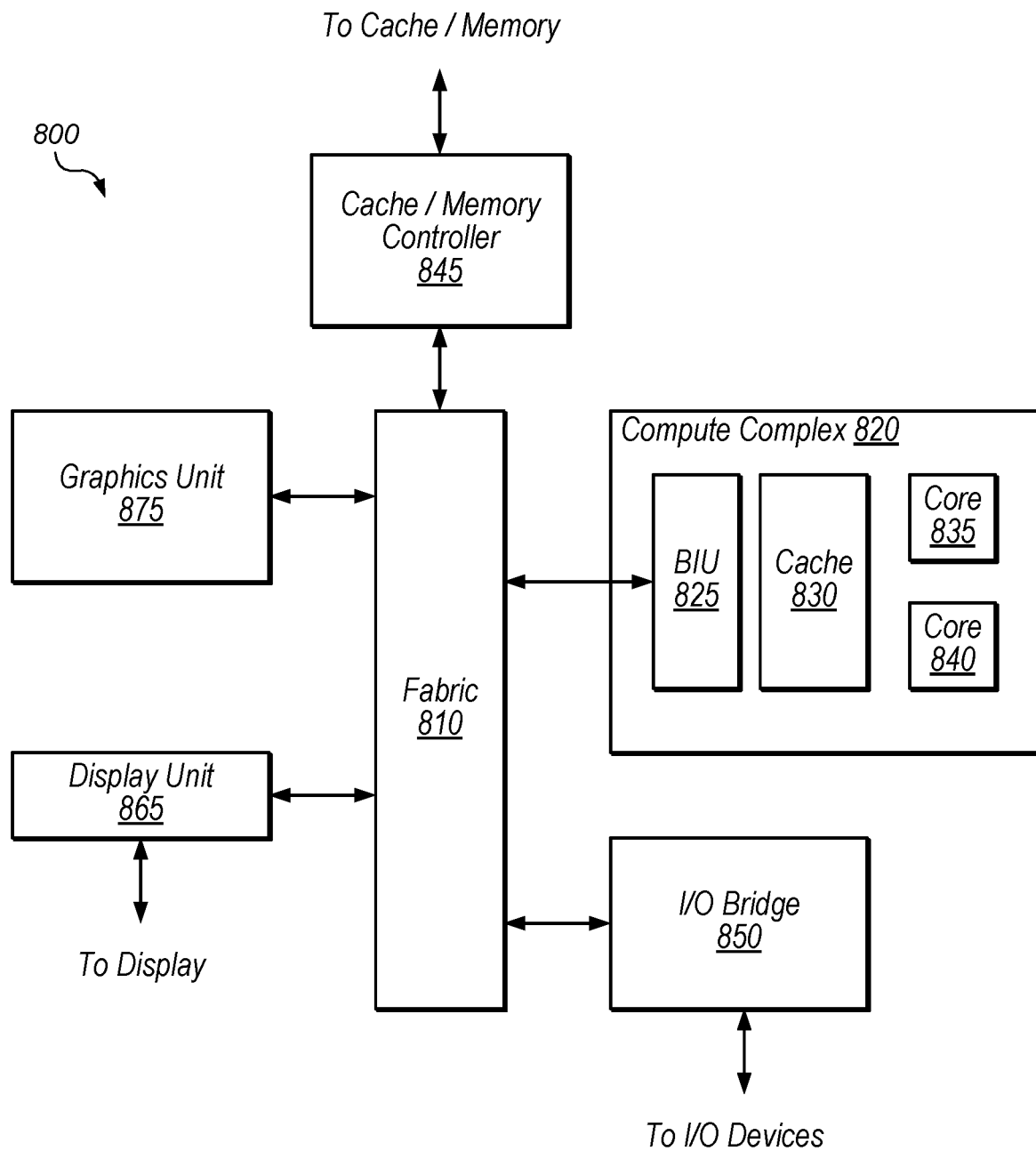
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Graphics unit 875 may include one or more processors, e.g., one or more graphics processing units (GPU's). Graphics unit 875 may receive graphics-oriented instructions, such as OPENGL®, Metal, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 875 implements one or more of the techniques or circuits discussed above. This may improve performance, reduce power consumption per unit of work, or both, relative to traditional techniques, particularly in larger distributed implementations (e.g., with a number of mGPUs).

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 800 with connectivity to various types of other devices and networks.

Example Applications

Figure 9:
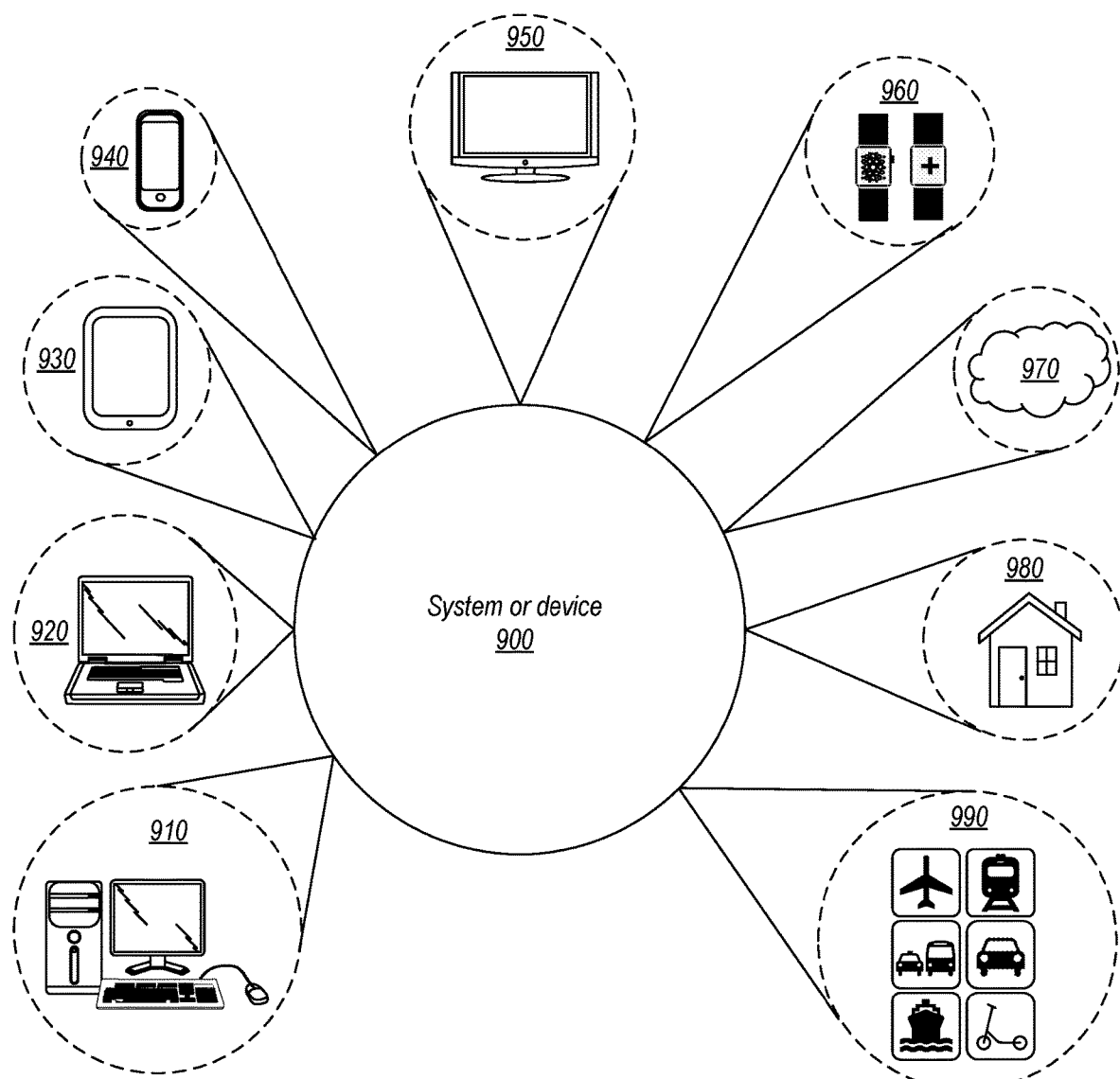
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 10:
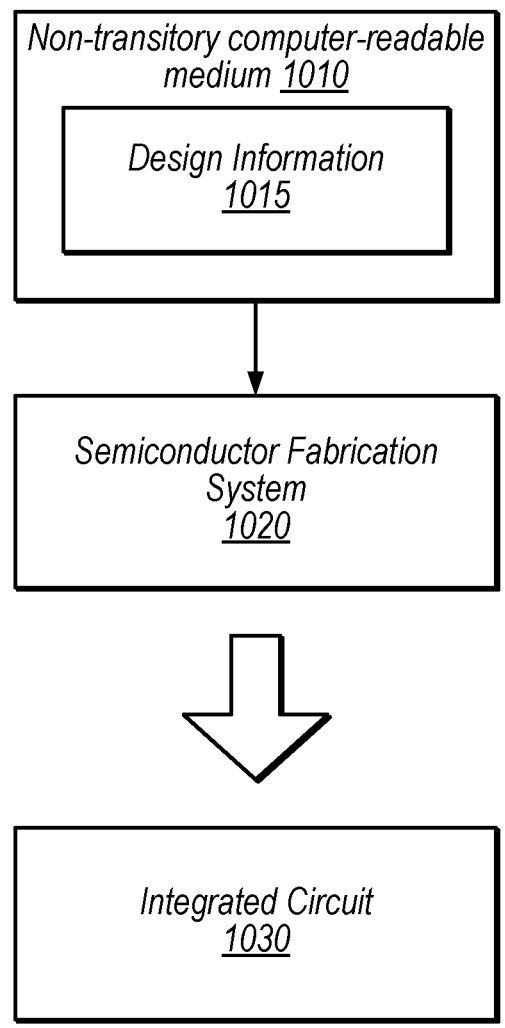
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment semiconductor fabrication system 1020 is configured to process the design information 1015 stored on non-transitory computer-readable medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system 1020. In some embodiments, design information 1015 may also include one or more cell libraries which specify the synthesis, layout, or both of integrated circuit 1030. In some embodiments, the design information is specified in whole or in part in the form of a netlist that specifies cell library elements and their connectivity. Design information 1015, taken alone, may or may not include sufficient information for fabrication of a corresponding integrated circuit. For example, design information 1015 may specify the circuit elements to be fabricated but not their physical layout. In this case, design information 1015 may need to be combined with layout information to actually fabricate the specified circuitry.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown in FIGS. 1B, 2, and 5. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising a graphics processor that includes:
   multiple geometry pipelines configured to process, in parallel, multiple segments of a set of graphics work;
   control circuitry configured to split operations from the set of graphics work into the multiple segments, including to:
      parse a control stream for the set of graphics work to determine initial work estimates of work included in respective draw calls based on numbers of primitives in different draw calls;
      adjust the initial work estimate for a draw call based on a complexity determination for the draw call; and
      distribute draw calls among the multiple segments, for processing in parallel by the multiple geometry pipelines, based on the adjusted work estimate; and
   stitch circuitry configured to stitch results of the multiple segments to generate a result for the set of graphics work.

2. The apparatus of claim 1, wherein the control circuitry receives the complexity determination from a graphics driver executed by a processor of the apparatus.

3. The apparatus of claim 1, wherein the complexity determination is based on:
   number of instructions and type of instructions included in a shader for a draw call.

4. The apparatus of claim 1, wherein the complexity determination is based on:
   data size of output data to be generated by the draw call.

5. The apparatus of claim 1, wherein control circuitry is configured to determine the number of primitives in different draw calls based on:
   amplification information; and
   tessellation information.

6. The apparatus of claim 1, wherein the adjusted work estimate is greater than the initial work estimate for a complexity determination that meets a threshold.

7. The apparatus of claim 1, wherein the complexity determination is based on:
   executing a version of an object shader included in the set of graphics work to determine a number of meshlets to be generated by the object shader.

8. The apparatus of claim 1, wherein the control circuitry is configured to assign draw calls to multiple bins based on the parse, including to increase amounts of work included in a given bin in response to reaching a threshold work estimate for the set of graphics work.

9. The apparatus of claim 8, further comprising:
   random access memory (RAM) circuitry configured to store information for the multiple bins.

10. The apparatus of claim 1, wherein the apparatus is a computing device that further includes:
    a central processing unit; and
    network interface circuitry.

11. A method, comprising:
    splitting operations from a set of graphics work into multiple segments, including:
       parsing a control stream for the set of graphics work to determine initial work estimates of work included in respective draw calls based on numbers of primitives in different draw calls;
       adjusting the initial work estimate for a draw call based on a complexity determination for the draw call; and
       distributing draw calls among the multiple segments based on the adjusted work estimate;
    processing, in parallel, the multiple segments of the set of graphics work; and
    stitching results of the multiple segments to generate a result for the set of graphics work.

12. The method of claim 11, wherein the complexity determination is generated by a graphics driver.

13. The method of claim 11, wherein the complexity determination is based on:
    number of instructions and type of instructions included in a shader for a draw call.

14. The method of claim 11, wherein the complexity determination is based on:
    data size of output data to be generated by the draw call.

15. The method of claim 11, wherein the numbers of primitives are based on amplification information and tessellation information in the control stream.

16. The method of claim 11, further comprising:
    assigning draw calls to multiple bins based on the parse; and
    increasing amounts of work included in a given bin in response to reaching a threshold work estimate for the set of graphics work.

17. A non-transitory computer-readable medium having instructions stored thereon that are executable by a computing device to perform operations comprising:
    determining, for a draw call in a set of graphics work, a complexity factor; and
    providing a control stream for the set of graphics work that includes the draw call and the complexity factor, wherein the complexity factor is usable as an input to determine distribution of draw calls among multiple segments of the set of graphics work for parallel processing; and
    receiving a result for the set of graphics work that is generated by parallel processing of the multiple segments and stitching results of the multiple segments to generate the result.

18. The non-transitory computer-readable medium of claim 17, wherein the operations further comprise:
    parsing the control stream to determine initial work estimates based on numbers of primitives in different draw calls;
    adjusting the initial work estimate for a draw call based on the complexity factor for the draw call; and
    distributing draw calls among the multiple segments based on the adjusted work estimate.

19. The non-transitory computer-readable medium of claim 17, wherein the instructions implement a graphics driver.

20. The non-transitory computer-readable medium of claim 17 wherein the determining is based on data size of output data to be generated by the draw call.

\* \* \* \* \*